UNITED STATES PATENT OFFICE.

JOHN ALBERT SWINDELL, OF PITTSBURGH, PENNSYLVANIA.

METHOD OF OPERATING REVERBERATORY IRON-MELTING FURNACES.

1,188,111. Specification of Letters Patent. Patented June 20, 1916.

No Drawing. Application filed June 8, 1915. Serial No. 32,950.

*To all whom it may concern:*

Be it known that I, JOHN ALBERT SWINDELL, a citizen of the United States, residing at Pittsburgh, in the county of Allegheny and State of Pennsylvania, have invented a new and useful Improvement in Methods of Operating Reverberatory Iron-Melting Furnaces, of which the following is a full, clear, and exact description.

In the melting of iron for foundry use in reverberatory furnaces, great difficulty is experienced in getting a proper uniform temperature of the iron from day to day. This is because of the fact that the action of these furnaces is very sensitive to changes in atmospheric conditions. These furnaces have heretofore been operated on a natural draft, and under certain atmospheric conditions, little if any trouble is experienced in bringing the molten iron to proper heat for pouring. Under other conditions, however, the action of the furnace is very sluggish, resulting in a "dull" heat and imperfect castings. I have discovered that these difficulties may be obviated and furnaces of this character operated, day after day, in the making of a uniform quality of molten iron by providing the ash pits of the furnaces with doors which may be closed, operating said furnaces on a natural draft with the ash pit doors open during the preliminary and melting stages of the operation, and when the iron reaches its full melted condition, closing the ash pit doors and finishing the heat with forced draft applied underneath the grate. By finishing the heat with the forced draft, heat after heat may be brought up to the same uniform pouring condition. To prevent formation of clinker at the grate and also to relieve the cutting action on the furnace lining, due to the use of the forced draw, steam may be introduced beneath the grate.

It is not practical to carry out the entire operation by forced draft, since a better melt of the iron can be obtained with a slower heat. Furthermore, the use of a forced draft during the entire operation would cause a very serious cutting action upon and rapid deterioration of the brickwork of the furnace. By using the natural draft while the iron is melting and a forced draft when the iron is in a proper pouring condition, the destructive action of the forced draft on the brickwork is reduced to a minimum and excellent results are obtained in practice. Inasmuch as I do not apply the forced draft until after the iron is melted and is therefore protected by a slag covering, oxidation of the iron by reason of the blast is largely prevented by such slag covering.

My improved method can be carried out with the reverberatory furnace ordinarily employed in melting pig iron for foundry use, by simply providing any suitable doors for the ash pit of the furnace, together with connections whereby a forced draft and steam may be introduced into the ash pit.

I claim:

1. The herein described method of melting iron in reverberatory furnaces, which consists in operating the furnace under a natural draft while the iron is melting and finishing the heat with a forced draft, substantially as described.

2. The herein described method of melting iron in a reverberatory furnace, which consists in operating the furnace with a natural draft while the iron is melting, and then closing the ash pit doors of the furnace and introducing a forced draft through the fuel bed to finish the heat, substantially as described.

3. The herein described method of melting iron in a reverberatory furnace, which consists in operating the furnace with a natural draft while the iron is melting, and then closing the ash pit doors of the furnace and introducing a forced draft through the fuel bed to finish the heat, and also introducing steam underneath the grate to reduce the clinker formation while the forced draft is operating, substantially as described.

4. The herein described method of melting iron in reverberatory furnaces, which consists in operating the furnace under a natural draft during the preliminary and melting stages of the operation and until the iron reaches substantially its full melted condition, and then finishing the heat with a forced draft applied upwardly through the fuel bed of the furnace.

In testimony whereof, I have hereunto set my hand.

JOHN ALBERT SWINDELL.

Witnesses:
GEO. H. PARMELEE,
H. M. CORWIN.

Copies of this patent may be obtained for five cents each, by addressing the "Commissioner of Patents Washington, D. C."